(12) United States Patent
Clewis et al.

(10) Patent No.: US 6,922,692 B2
(45) Date of Patent: Jul. 26, 2005

(54) DIRECTED NON-CYCLIC GRAPH WALKING SYSTEM AND METHOD

(75) Inventors: Fred T. Clewis, Stanley, NC (US); Richard A. Sitze, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 10/039,725

(22) Filed: Oct. 26, 2001

(65) Prior Publication Data

US 2003/0084054 A1 May 1, 2003

(51) Int. Cl.$^7$ ................................................ G06F 17/30

(52) U.S. Cl. ........................................ 707/6; 707/102

(58) Field of Search ................... 707/1–10, 100–104.1, 707/200–205; 709/203

(56) References Cited

U.S. PATENT DOCUMENTS

| | | | | |
|---|---|---|---|---|
| 4,698,752 A | * | 10/1987 | Goldstein et al. | 707/8 |
| 5,379,422 A | | 1/1995 | Antoshenkov | |
| 5,386,394 A | | 1/1995 | Kawahara et al. | |
| 5,761,664 A | * | 6/1998 | Sayah et al. | 707/100 |
| 5,761,667 A | | 6/1998 | Koeppen | |
| 5,877,775 A | | 3/1999 | Theisen et al. | |
| 6,055,539 A | | 4/2000 | Singh et al. | |
| 2003/0050915 A1 | * | 3/2003 | Allemang et al. | 707/1 |

FOREIGN PATENT DOCUMENTS

WO    WO 99/08170    2/1999

OTHER PUBLICATIONS

Li et al., "Object recognition based on graph matching implemented by a hopfield–style neural network", Dept. of Electr. Eng., Worcester Polytech. Inst., MA, USA, Jun. 18–22, 1989, pp. 287–290 vol. 2.*

Luo et al., "Strructural graph matching using the EM algorithm and singular value decomposition", Dept. of Comp. Sci., york Univ., UK, IEEE, Oct. 2001, pp. 1120–1136.*

Gamma, Helm, Johnson and Vlissides, "Design Patterns—Elements of Reusable Object–Oriented Software," ISBN 0–201–63361–2, pp. 293–303, 1995.

Keqin, L., "A method for evaluating the expected load of dynamic tree embeddings in hypercubes," International Journal of Foundations of Computer Science, vol. 11, No. 2, pp. 207–230, Jun. 2000.

(Continued)

Primary Examiner—Mohammad Ali
(74) Attorney, Agent, or Firm—Norman L. Gundel; Hoffman, Warnick & D'Alessandro LLC

(57) ABSTRACT

A system and method for efficiently walking a directed non-cyclic graph of data using multiple analysis tools. Provided is a graph walking system, including: a binding system for binding a graph observer with a data graph, for binding node patterns to node observers to generate at least one node pattern/node observer pair, and for binding the data graph observer to at least one node pattern/node observer pairing, and wherein each node pattern includes a computed set of target sub-node patterns; a node relationship graph (NRG), wherein each node in the NRG corresponds to at least one node in the data graph, and wherein each node in the NRG includes a computed set of valid sub-node patterns; graph walking logic for systematically walking through nodes in the data graph and corresponding nodes in the NRG; and a pattern testing system that determines if the set of target sub-node patterns for a node pattern matches the set of valid sub-node patterns for a corresponding NRG node when a node is encountered in the data graph.

20 Claims, 8 Drawing Sheets

OTHER PUBLICATIONS

Wagner, IA, Lindenbaum, M., Bruckstein, AM, "ANTS: agents on networks, trees, and subgraphs," Future Generation Computer Systems, vol. 16, No. 8, pp. 915–926, Jun. 2000.

Wirth, HC, Steffan, J., "On minimum diameter spanning trees under reload costs," Graph–Theoretic Concepts in Computer Science, 25th International Workshop, WG'99, Proceedings (Lecture Notes in Computer Science vol. 1665), Ascona, Switzerland, Jun. 17–19, 1999.

Kegin, L., "Barrel shifter—a close approximation to the completely connected network in supporting dynamic tree structured computations," Proceedings of the IEEE 1997 National Aerospace and Electronics Conference, Dayton, Ohio, Jul. 14–17, 1997.

Shade, J., et al., "Hierarchical image caching for accelerated walkthroughs of complex environments," Computer Graphics Proceedings, SIGGRAPH '96, New Orleans, LA, Aug. 4–9, 1996.

* cited by examiner

DIRECTED NON-CYCLIC GRAPH WALKING SYSTEM AND METHOD

BACKGROUND OF THE INVENTION

1. Technical Field

The present invention relates generally to analyzing and processing hierarchical data structures represented as directed graphs, and more particularly relates to a system and method for providing an optimized parallel analysis of hierarchical data. This includes directed graph representations of tree's and other non-cyclic graphs.

2. Related Art

The collection, processing, and analysis of electronic information have become critical tools in today's business methodologies. For instance, businesses recognize the importance of leveraging electronic information in order to more efficiently deliver goods and services to consumers. Analysis of such information might provide important business intelligence, reveal consumer interests, and determine marketplace trends.

However, as the amount of electronic information that is generated continues to grow, the ability to effectively and efficiently analyze the information becomes more challenging. Specifically, there is a significant time and cost factor involved in analyzing and processing large databases of information (i.e., data mining). For many large institutions, it may take on the order of hours to analyze or "walk through" a database of electronic information. The problem is further exacerbated when different processing or analysis tools must be run on the same set of data. In this case, the time and cost factor is multiplied by the number of required tools.

One method for handling large databases is to store, or arrange the information in a hierarchy. Directed non-cyclic graphs comprise nodes arranged in a generally hierarchical fashion, with the more general information stored at the top, and more specific information branched off below, terminating in leaf nodes. Leaf nodes do not have children (directed lines from the leaf node to another node). In some cases, information stored at the lower levels of the hierarchy may be referenced by multiple nodes higher in the graph, representing multiple references to common, or shared, information. Since the graph is non-cyclic, there is never a path from any given node that arrives back at that same node.

U.S. Pat. No. 6,055,539, entitled METHOD TO REDUCE I/O FOR HIERARCHICAL DATA PARTITIONING METHODS, issued on Apr. 25, 2000, which is hereby incorporated by reference, describes a method for classifying hierarchical data to allow for more efficient processing of a data set.

While data hierarchies and related methods for storing data have improved the process of analyzing large databases, the prior art has failed to adequately solve the problem of efficiently performing multiple processes or applying multiple tools to a set of hierarchical data. For example, a straightforward recursive descent walk of a hierarchical data tree (a tree is a simple directed non-cyclic graph) of N nodes by M analysis routines would require N*M visits to the individual nodes. As is evident, a more efficient mechanism for handling this situation is required.

"Design Patterns—Elements of Reusable Object-Oriented Software," by Gamma, Helm, Johnson, and Vlissides (ISBN 0-201-63361-2), pages 293–303, copyright 1995, which is hereby incorporated by reference, describes an 'Observer', or 'Publish-Subscribe' design pattern. While not directly applicable to a static directed graph, the mechanism describes an 'event drive' model for processing data that has been used to allow multiple analysis routines access to the hierarchical data. Such algorithms are frequently used in the processing of XML, for example the Simple API for XML (SAX) uses this event driven model. However, this disclosure fails to provide efficient optimization techniques for handling such data.

SUMMARY OF THE INVENTION

The present invention solves the above-mentioned problems, as well as others, by providing a system and method that allow multiple analysis tools to process a directed non-cyclic graph in parallel, and efficiently "prune" or eliminate the processing of unnecessary data. In a first aspect, the invention provides a graph walking system, comprising: a binding system for binding a graph observer with a data graph (e.g., a directed non-cyclic graph), for binding node patterns to node observers to generate at least one node pattern/node observer pair, and for binding the data graph observer to at least one node pattern/node observer pairing, and wherein each node pattern includes a computed set of target sub-node patterns; a node relationship graph (NRG), wherein each node in the NRG corresponds to at least one node in the data graph, and wherein each node in the NRG includes a computed set of valid sub-node patterns; graph walking logic for systematically walking through nodes in the data graph and corresponding nodes in the NRG; and a pattern testing system that determines if the set of target sub-node patterns for a node pattern matches the set of valid sub-node patterns for a corresponding NRG node when a node is encountered in the data graph.

In a second aspect, the invention provides a system for optimizing a graph walking process of an inputted data graph based on inputted node patterns and a node relationship graph (NRG) that corresponds to the inputted data graph, the system comprising: a system for generating a set of valid sub-node patterns for each node in the NRG (which may be pre-computed); a system for generating a set of target sub-node patterns for each inputted node pattern; a graph processor for systematically walking through nodes within the data graph and corresponding nodes in the NRG; a pattern testing system that determines if the target sub-node patterns for a node pattern matches the valid sub-node patterns for a corresponding node in the NRG when a node is encountered in the data graph.

In a third aspect, the invention provides a method for analyzing a graph of hierarchical data, comprising the steps of: binding a plurality of graph observers to the graph, wherein each graph observer is further bound to a set of inputted node patterns and a set of inputted node observers; computing a set of target sub-node patterns for each inputted node pattern; providing a node relationship graph (NRG) for the graph, wherein each node in the NRG corresponds to a node in the graph; computing a set of valid sub-node patterns for each node in the NRG; systematically walking through nodes within the graph; testing to determine if the target sub-node patterns for a node pattern matches the valid sub-node patterns for a corresponding NRG node when a node is encountered in the graph; and deactivating an identified graph observer for sub-nodes of an encountered node if none of the target sub-node patterns associated with node patterns bound to the identified graph observer match valid sub-node patterns.

In a fourth aspect, the invention provides a program product stored on a recordable medium, which when executed, optimizes a graph walking process of an inputted data graph based on inputted node patterns and a node relationship graph (NRG) that corresponds to the inputted data graph, the program product comprising: means for generating a set of valid sub-node patterns for each node in the NRG; means for generating a set of target sub-node patterns for each inputted node pattern; means for systematically walking through nodes within the data graph and corresponding nodes in the NRG; means for determining if the target sub-node patterns for a node pattern match the valid sub-node patterns for a corresponding node in the NRG when a node is encountered in the data graph.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE INVENTION

1. Graph Walking Architecture

Figure 1:
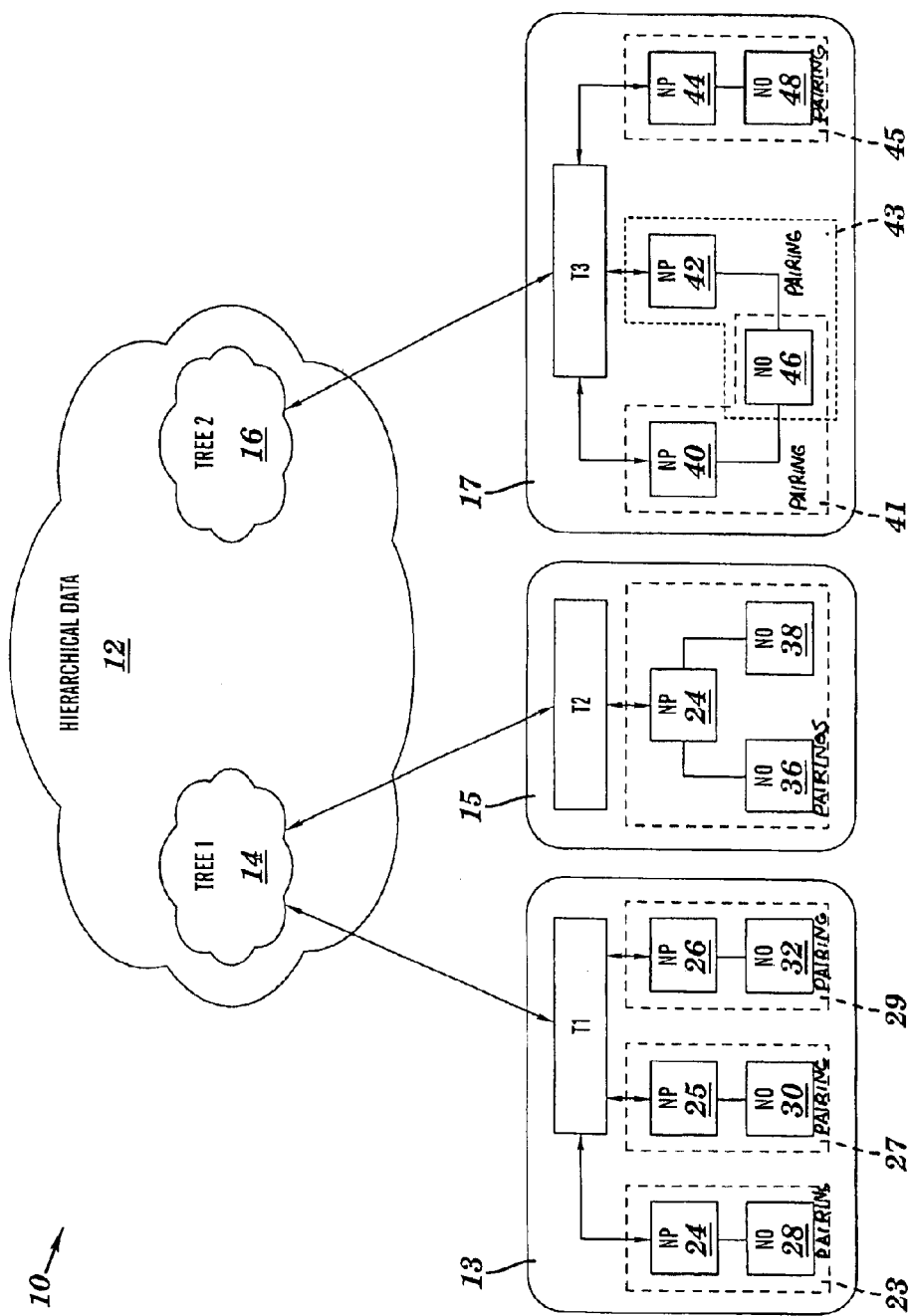
FIG. 1 depicts a block diagram of an exemplary graph observer architecture in accordance with the present invention.

Referring now to the figures, FIG. 1 depicts an exemplary graph walking architecture 10 in accordance with the present invention that allows multiple analysis tools to efficiently operate on hierarchical data 12 in a parallel manner. As shown, hierarchical data 12 comprises a first graph 14 and a second graph 16. Each graph is composed of a hierarchy of nodes, and each graph may be a subgraph of some larger graph. Bound to the first graph 14 are two graph observers T1 and T2. Bound to the second graph 16 is a third graph observer T3. Each graph observer embodies a method of analyzing/processing the information in the graph to which it is bound (i.e., it provides an analysis tool). A graph walker, or graph walking logic, which systematically guides the processing of nodes within the graph, handles the process of actually walking through a graph. As each graph is walked, the logic compares graph nodes against node patterns, which will in turn cause one or more node observers to analyze or process a particular matching node.

Exemplary node patterns might include named or unnamed node attributes, node types, or node patterns. A simple node pattern identifies distinguishing node attributes (i.e. names and/or types) of a single node by specifying attribute-patterns for each attribute of a node. An attribute-pattern name might be "exact match", "phonetic match" (e.g., a soundex algorithm), or a regular expression (i.e., wild-card) match. For example, a simple node pattern could specify match "fred" for the name attribute, and match-any for all other attributes of a node.

A generational node pattern extends the simple node pattern to include relationships between nodes. The generational node pattern is a sequence of simple node patterns: characterized by a focus node pattern that is aligned with the node being matched against the pattern. For example, a generational node pattern could be a root node specifying match "jim" for the name, a child node specifying match "married" for marriage-status, a grandchild node specifying match "lisa" for the name, and match any for all other attributes of all three node types. If the focus node pattern is set to the grandchild, then the pattern would match a node named "lisa," whose parent was "married," and whose grandparent was named "jim."

As can be seen, each graph observer T1, T2 and T3 is bound to one or more sets or "pairings" (shown within dotted lines) of node patterns (NP) and node observers (NO). Within each pairing, one or more node patterns are bound to one or more node observers. Thus, for example, graph observer T1 is shown bound to: a first pairing 23 comprised of node pattern 24 and node observer 28; a second pairing 27 comprised of node pattern 25 and node observer 30; and a third pairing 29 comprised of node pattern 26 and node observer 32. Graph observer T2 is similarly bound to a pairing comprised of node pattern 24 and node observers 36 and 38. Note that two instances of the same node pattern may exist. For example, graph observers T1 and T2 both have pairings that use node pattern 24.

Graph observer T3, which is bound to the second graph 16, is bound to three pairings 41, 43, and 45. Pairing 41 comprises node pattern 40 and node observer 46. Pairing 43 comprises node pattern 42 and node observer 46. Pairing 45 comprises node pattern 44 and node observer 48. Note that a single instance of node observer 46 is shared by different pairings 41 and 43. Accordingly, unique groupings of graph, graph observer, node pattern(s) and node observer(s) are created, which may be referred to herein as graph/graph observer sets. It should be understood that the number and arrangement of graphs, graph observers, node patterns, and node observers shown in FIG. 1 are for exemplary purposes only.

Because of the binding between graph observers and node observers, graph observers T1 and T2 are able to efficiently process graph 14 in a parallel manner. As will be described in further detail below, the graph walking process is made more efficient based on information discerned by the node observers. In particular, the node observers can cause their respective graph observers to become inactive while sub-nodes are being walked (a first pruning system), and in certain cases cause the walking of sub-nodes to be skipped entirely (a second pruning system). These two pruning mechanisms greatly enhance the efficiency of the graph walking system of the present invention, particularly in the case where multiple graph observers (i.e., analysis tools) operate on a single graph.

Although the exemplary embodiments described herein are directed at optimizing the walking of hierarchical data graphs, it should be appreciated that the techniques, systems and methods described herein could be readily applied to any type of "directed graph." Directed graphs describe directed relationships (e.g., edges and lines) between entities (e.g., nodes).

2. Graph Walking Optimization Overview

Figure 2:
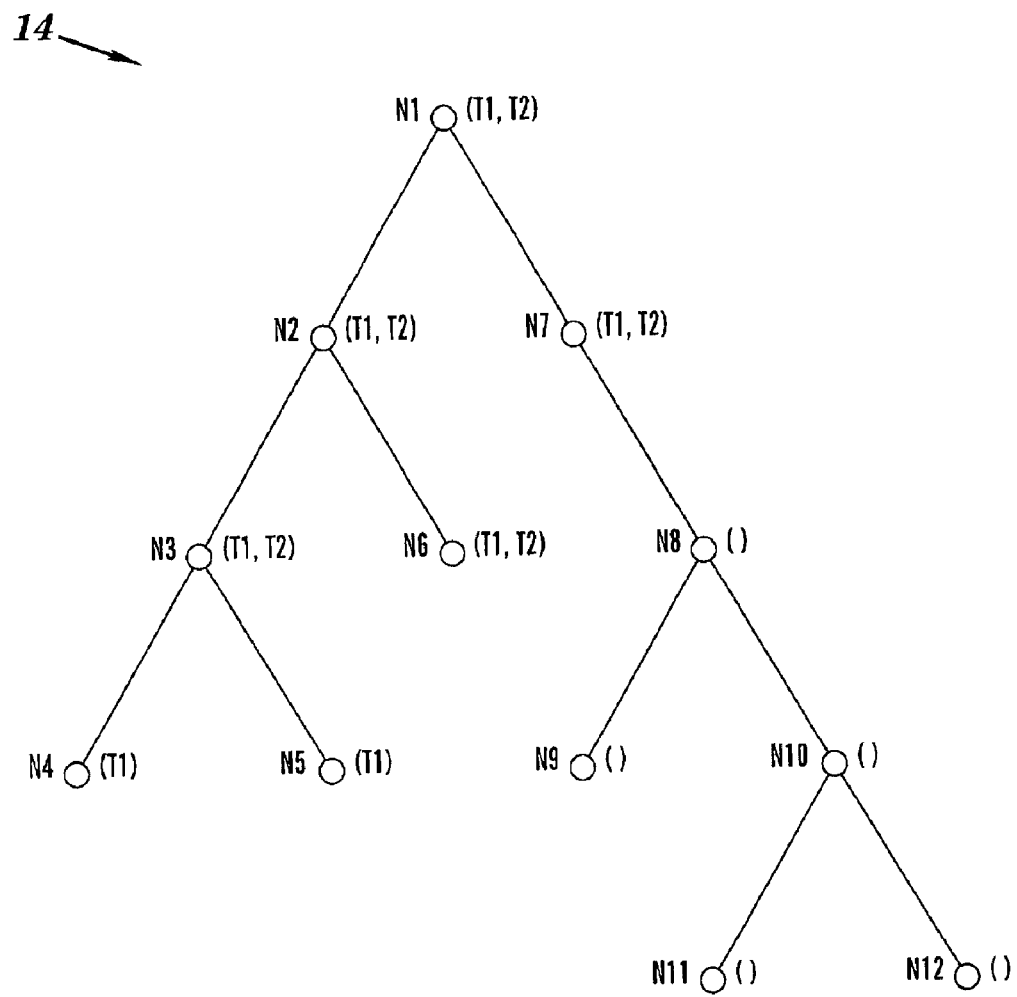
FIG. 2 depicts an exemplary directed non-cyclic graph, in this case a tree.

Referring now to FIG. 2, exemplary graph 14 is shown in greater detail. Specifically, graph 14 is shown comprised of twelve nodes N1, N2, N3, . . . N12 arranged in a hierarchical manner. Assuming a straightforward recursive descent walk of the graph 14, node N1 would be processed first, followed by node N2, etc., until node N12. To illustrate how the invention might operate, each node is shown with parentheses listing the graph observers that are active when the node is encountered by the graph walking logic. As noted above, graph observers can be made inactive for the processing of the sub-nodes of the encountered node when a node observer determines that there is no interest in the sub-nodes. In this example, both graph observers T1 and T2 are active for processing of nodes N1, N2, N3, N6 and N7. However, when node N3 was encountered, a determination was made to deactivate graph observer T2 for the processing of sub-nodes N4 and N5 (using a first pruning system described below). Thus, only graph observer T1 remains active while nodes N4 and N5 are walked.

Furthermore, during the processing of node N7, it was determined to deactivate graph observers T1 and T2 for sub-nodes N8–N12. In this situation, because all graph observer were made inactive for sub-nodes N8–N12, a second pruning system will cause the graph walking logic to entirely skip the walking of nodes N8–N12. It should be appreciated that graph 14, as well as the graph observers that are shown processing the nodes, are shown for exemplary purposes only, and obviously a much more complex graph could be walked using this methodology.

3. Graph Walking Optimization Algorithm

A. Overview

The present invention utilizes a node pattern matching process to determine when sub-node processing should be skipped. In general, during the graph walking process, nodes are processed in a hierarchical fashion such that parent nodes are always processed prior to any child node. For example: a top-down, left-right recursive descent graph walk processing each node as it is encountered. During the processing of each node, node patterns (bound to graph and node observers) are compared to the node being processed. If the node pattern does not match the node, then the graph observer can be deactivated for all sub-nodes of the processed node (first pruning system). If all graph observers are deactivated, then the graph walking logic can entirely skip the walking of the sub-nodes (second pruning system).

B. Detailed Embodiment

A preferred implementation for the optimization algorithm is described next. As noted, a given graph to be walked is composed of nodes. Each node has a set of attributes including node type, values, data types, or other distinguishing characteristic of a node. Examples include, but are not to be limited to, node-type, name, color, and location. Each attribute may be typed as a numeric value, string, compound data type, or other data which can be represented as a finite sequence of binary values (0 & 1).

An attribute-pattern specifies a pattern that is to be compared with an attribute's value to determine if the pattern matches the value. Various comparison algorithms exist for this purpose. Well-known and established comparison algorithms include exact match, range of valid values (for ordered data types), list of valid values, phonetic match via soundex or other algorithm (for string or character sequence), and regular expression (or other wild-card scheme) match. This invention is not limited to any specific comparison algorithm, and the use of any such algorithm is within the scope of this invention.

The simple node pattern specifies a set of attributes and corresponding attribute-patterns of a single node that must match the corresponding attributes and attribute values of the node. Specifically, each attribute specified by the simple node pattern must be defined by (or exist for) the node, and the corresponding attribute-patterns must match the corresponding attribute values. For example, the pattern could specify 'match "fred"' for the name attribute, and 'match blue' for eye-color.

A generational node pattern specifies a sequence of simple node patterns that must match a top-down sequence of nodes that occur within the graph. A generational node pattern is characterized by:

1. a list of 1 or more simple node patterns: $P_1, P_2, \ldots P_f$
2. a root node pattern $P_1$.
3. a focus node pattern $P_f$. The focus node pattern will be the last node pattern; note that $1 <= f$.

The generational node pattern $P_1, P_2, \ldots P_f$ with a focus node pattern $P_f$ is defined to match a node N in the graph if and only if:

1. The simple node pattern $P_f$ matches N.
2. f=1 OR the generational node pattern $P_1, P_2, \ldots P_{f-1}$ with focus node pattern $P_{f-1}$ matches the parent of N.

For example, consider a generational node pattern with a root node pattern specifying 'match "jim"' for the name, a child node pattern specifying 'match "married"' for marriage-status, and a grandchild node pattern specifying 'match "lisa"' for the name. The focus node pattern is the grandchild of the root, so the pattern would match a node that was named "lisa", whose parent was "married," and whose grandparent was named "jim."

This embodiment provides for a definition of valid relationships between nodes by specifying valid node hierarchies and simple node patterns for nodes within the hierarchy. These relationships are expressed in a directed graph, which is referred to as a node-relationship-graph (NRG). Each node of the NRG represents a simple node pattern that describes what can be expected of a corresponding node in the data graph. Each directed line of the NRG defines a parent/child relationship between two nodes: from a parent node to a child node. The root of the NRG describes the root of the data-graph. Note that while the data graph is non-cyclic, the NRG may be cyclic.

When moving from a parent node to a child node in the data-graph, a corresponding move takes place in the NRG from a parent node to a set of child nodes. An NRG-node's children define a set of valid child node patterns, and the corresponding data-graph node's child is expected to match one or more of these node patterns. It is expected that the data graph adheres to the restrictions described by the NRG. The purpose of the NRG is to allow optimal pruning of the data-graph, as opposed to validation of the integrity of the data-graph.

Accordingly, given the NRG for a graph T, and a given node N in the graph T, a set of simple node patterns that match N are known.

Pre-analysis of the NRG establishes a set of valid sub-node patterns for each node N in the NRG. The valid sub-node pattern set is the set of all node patterns found below N, and this set is stored with N in the NRG. "Below" is defined as those nodes that can be reached by following directed-lines from parent node to child.

The NRG for the data graph is loaded into a data structure at the startup of the graph walking program, and includes the sets of valid sub-node pattern for each node.

For each node pattern (NP), a set of target sub-node patterns is defined. For a simple-node pattern P, the set of target sub-node patterns is { }. For a generational node pattern $P_1, P_2, \ldots P_f$, the target sub-node patterns set is established for each simple pattern $P_1, P_2, \ldots P_{f-1}$. For $P_n$, the set is $\{P_{1+1}, \ldots P_f\}$. An analysis of all generational node patterns bound to a node observer computes each such set, and each set is bound to the node pattern.

While recursively walking the graph, each node N in the data graph will correspond to a set of matching nodes in the NRG. This is referred to herein as the Corresponding-NRG-Node set, or the $CNN_N$ set for the node N. When descending from N to a child C in the data-graph, $CNN_C$ is the set of children of nodes in $CNN_N$ that matches C. For every CNN set, the CNN's valid sub-node patterns set is computed as the union of the valid sub-node patterns sets for each member of the CNN.

While walking the data-graph, the graph walker determines a set of node-observer/pattern bindings (NOPB) for each active graph observer for each node in the graph. The NOPB for a graph observer at a node N is the set of node-observer/pattern bindings such that the node patterns could occur within a sub-graph of N. The NOPB for a graph observer at a node in the graph is determined as follows:

For the root-node: Given the set of node-observer/patterns bound to a graph observer, each node pattern is inspected. If the intersection of the node pattern's set of target sub-node patterns with the CNN's set of valid sub-node patterns (Point 10) is empty, then the node pattern will not match any node below the root-node. If the intersection is not empty, then there is a potential match, and the node-observer/pattern pair is added to the NOPB.

For a child-node: Each node pattern in the parent-node's NOPB is inspected. If the intersection of the node pattern's set of target sub-node patterns with the CNN's set of valid sub-node patterns is empty, then the node pattern will not match any node below the current node. If the intersection is not empty, then there is a potential match, and the node-observer/pattern pair is added to the child's NOPB.

As each node is visited during a graph-walk, after all matching node patterns are established, and 'encountered' events generated to corresponding node-observers as appropriate, the NOPB is computed as described above for the current node N in the graph for each active graph observer. If the NOPB for a given graph observer is empty for node N, then there are no node patterns that can match a node below N in the data graph. In this case, the graph observer is marked inactive.

4. Graph Walking System

Figure 3:
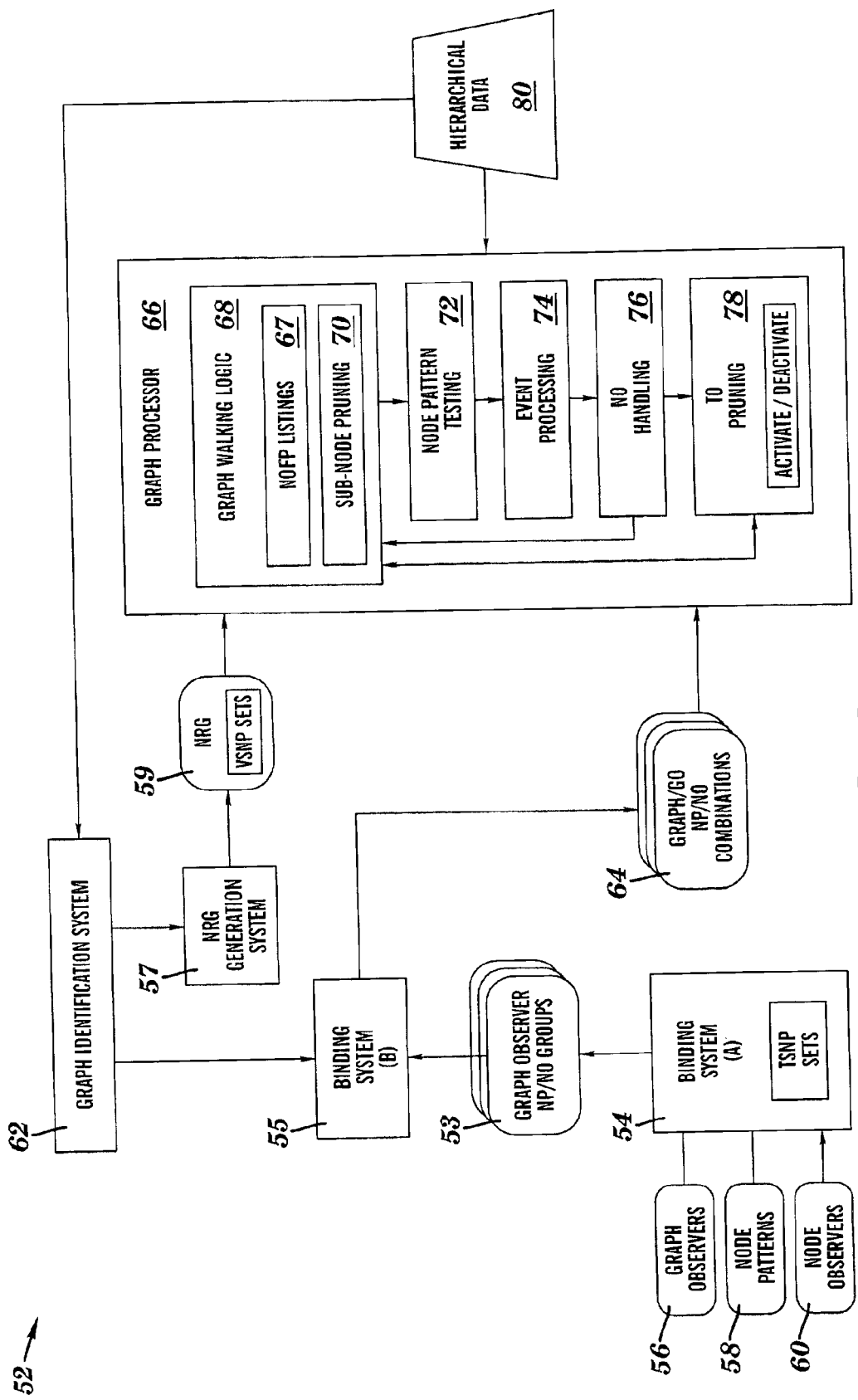
FIG. 3 depicts a block diagram of a graph walking system in accordance with a preferred embodiment of the present invention.

Referring now to FIG. 3, a graph walking system 52 is shown for operating on hierarchical data 80. Graph walking system 52 generally comprises a graph identification system 62, binding systems 54, 55, NRG generation system 57, and a graph processor 66. Graph identification system 62 identifies graphs within the hierarchical data 80 that are to be processed. Each identified graph may be referred to as a root graph, or a subgraph of a root graph that is to be walked. It should be noted that multiple graphs may be identified for a single walking process.

Binding system (A) 54 receives the sets (i.e., zero or more) of graph observers 56, node patterns 58, and node observers 60. As shown in FIG. 1, each graph observer is bound to one or more pairings (i.e., bound sets of node patterns and node observers). Binding system 54 thus creates one or more "graph observer/(node pattern-node observer pairings)" groupings 53, such as groupings 13, 15 and 17 shown in FIG. 1. Binding system A 54 also includes a for generating target sub-node patterns (TSNP's) for each node pattern 58. Specifically, an analysis of all generational node patterns bound to a node observer determines each such set, and each set is bound to the node pattern.

Each grouping 53 is then further bound to a graph (as identified by graph identification system 62) by binding system (B) 55. Note that a graph observer may be bound to more than one graph, and multiple graph observers may be bound to a single graph. The output is a set of graph/graph observer combinations 64 that each include one or more node pattern-node observer pairings. The graph/graph observer combinations 64 form the analysis tools that will facilitate the processing of hierarchical data 80 using graph processor 66.

NRG generation system 57 generates a node relationship graph (NRG), as described above, for the graph identified by graph identification system 62. The generated NRG establishes a set of valid sub-node patterns (VSNP's) for each node in the NRG. Each set is stored with the associated node in the NRG. Each VSNP set contains the set of node patterns found below the associated node.

During processing, graph processor 66 walks each graph separately and includes graph walking logic 68 that determines how the nodes within the graph will be walked (e.g., a left-right recursive descent). Graph walking logic 68 includes a sub-node pruning system 70 that can dynamically cause graph walking logic 68 to skip the walking of groups of sub-nodes. Specifically, sub-node pruning 70 will cause a set of sub-nodes not to be walked when all of the graph observers have been made inactive for the set of sub-nodes. The process for deactivating sets of sub-nodes is described in further detail below.

Graph processor 66 further includes a node pattern testing system 72 that determines if, for an encountered node, any of the node patterns could occur within a sub-graph of the node. This is achieved as follows:

(1) For an encountered graph node, determine a set of matching nodes in the NRG.

(2) Determine the set of valid sub-node patterns associated with the matching NRG nodes.

(3) For the encountered graph node, compare the target sub-node patterns bound to a graph observer with the valid sub-node patterns to determine if a match exists.

If a match does not exist, the sub-nodes can be pruned.

The comparison process can be implemented as follows. For root nodes, each node pattern within the entire set of node pattern/node observers bound to a graph observer are inspected. If the intersection I of (a) the node pattern's set of target sub-node patterns with (b) the set of valid sub-node patterns from the associated matching NRG nodes is empty, then the node pattern will not match any node below the root node. If the intersection I is not empty, there is a potential match, and the node pattern/node observer pair is added to the NOPB list for that root node. This is repeated for each node pattern.

For child nodes, only the node patterns in the parent node's NOPB list are inspected. If the intersection I of (a) the node pattern's set of target sub-node patterns with (b) the set of valid sub-node patterns from the associated matching NRG nodes is empty, then the node pattern will not match any node below the root node. If the intersection I is not empty, there is a potential match, and the node pattern/node observer pair is added to the NOPB list for that child node. This is repeated for each node pattern.

As each node is visited during a graph-walk, after all matching node patterns are established, and 'encountered' events generated to corresponding node-observers as appropriate, the NOPB is computed as described above for the current node N in the graph for each active graph observer. If the NOPB for a given graph observer is empty for node N, then there are no node patterns that can match a node below N in the data graph. In this case, the graph observer is marked inactive by TO pruning 78.

When an encountered event is generated, node observer handling system 76 causes the registered node observer to handle the event. During the handling of the event, the node observer can notify graph observer pruning system 78 that processing of sub-nodes (if present) should proceed, or that the sub-nodes should be pruned. Specifically, graph observer pruning system 78 is provided to activate or deactivate graph observers associated with node observers that are handling such events. Thus, if a node observer determines that there is no interest in a set of sub-nodes, graph observer pruning system 78 will deactivate the graph observer associated with the node observer for the processing of the sub-nodes. If all of the graph observers are made inactive for a particular set of sub-nodes, then graph walking logic 68 will skip the walking of the set of sub-nodes (i.e., sub-node pruning 70 will be executed).

When the walk of a set of sub-nodes of a node has been completed, any graph observers that were made inactive by the encountered event are reactivated, i.e., made active. Moreover, a completed event is generated for each node observer that received an encountered event and which indicated that the sub-nodes should be walked (i.e., its graph observer remained active). In addition to the features described above, a completed event may notify the graph walking logic 68 that the sub-nodes must be walked again.

5. Node Walking Methodology

Figure 4:
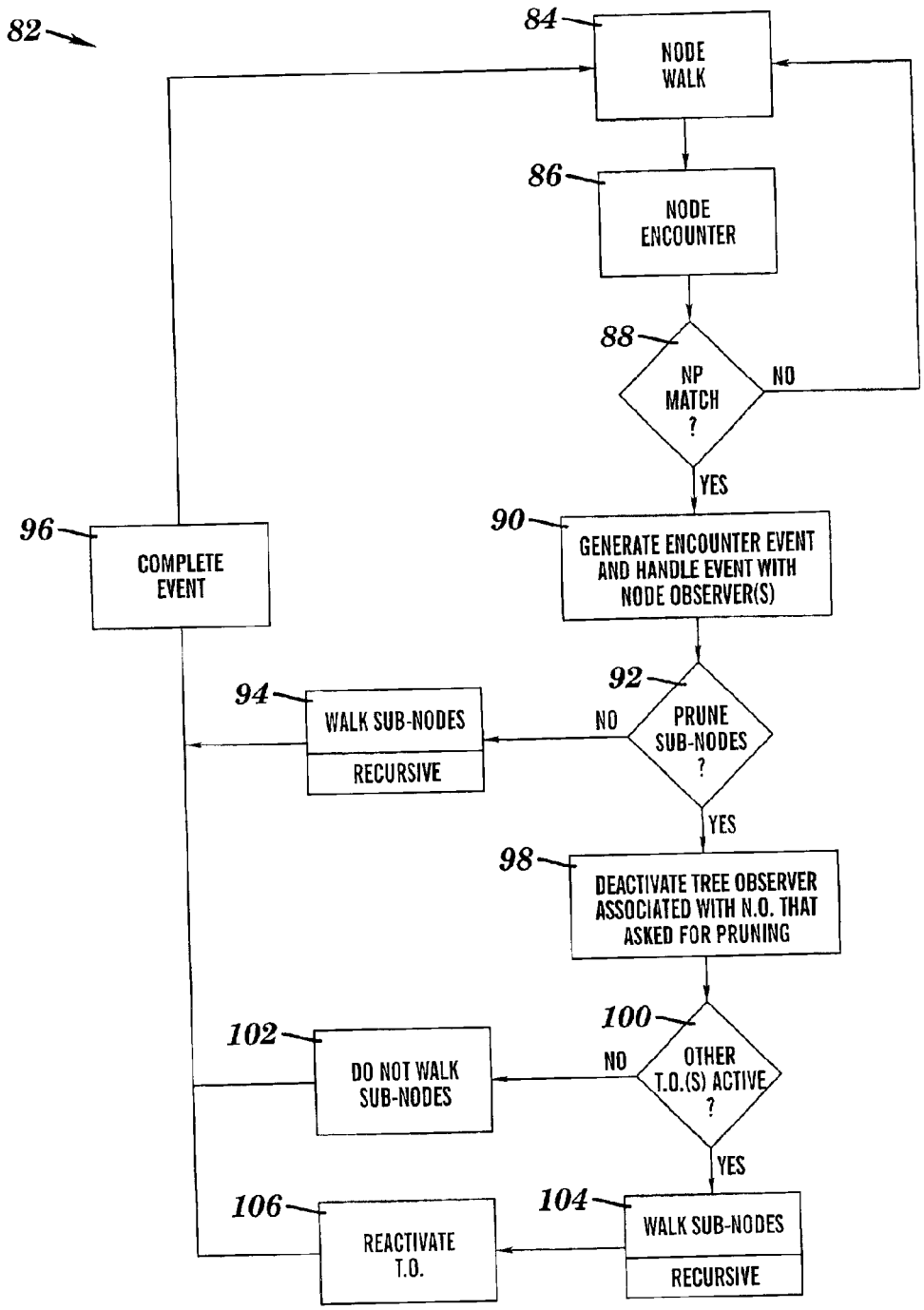
FIG. 4 depicts a flow diagram of a graph walking method in accordance with the present invention.

Referring now to FIG. 4, a method flow chart 82 that describes the walking of a node is depicted. First, a node walk 84 is initiated until a node encounter 86 occurs. At that point, node pattern testing occurs in the manner described above to determine if there is a match 88. If there is no match, the node walk 84 continues. If there is a match, an encounter event is generated and the event is handled with one or more node observers 90. The node observers then determine if sub-nodes of the encountered node should be pruned 92. If no pruning is required, then the sub-nodes are walked 94, the event is completed 96, and node walk continues 84. Note that the walking of the sub-nodes 94 is done recursively using the logic beginning at node walk 84.

If pruning is required, the graph observer associated with the node observer that asked for pruning is deactivated 98. Next, it is determined if other graph observers are active 100. If no other graph observers are active the sub-nodes are not walked 102, the event is completed 96, and the node walking continues 84. If there are other graph observers that are active, then the sub-nodes are walked 104. Walking of sub-nodes 104 is likewise done in a recursive manner using the logic beginning at node walk 84. When the sub-node walking is complete, the graph observer is reactivated 106, the event is completed 96, and node walking continues 84.

Figure 5:
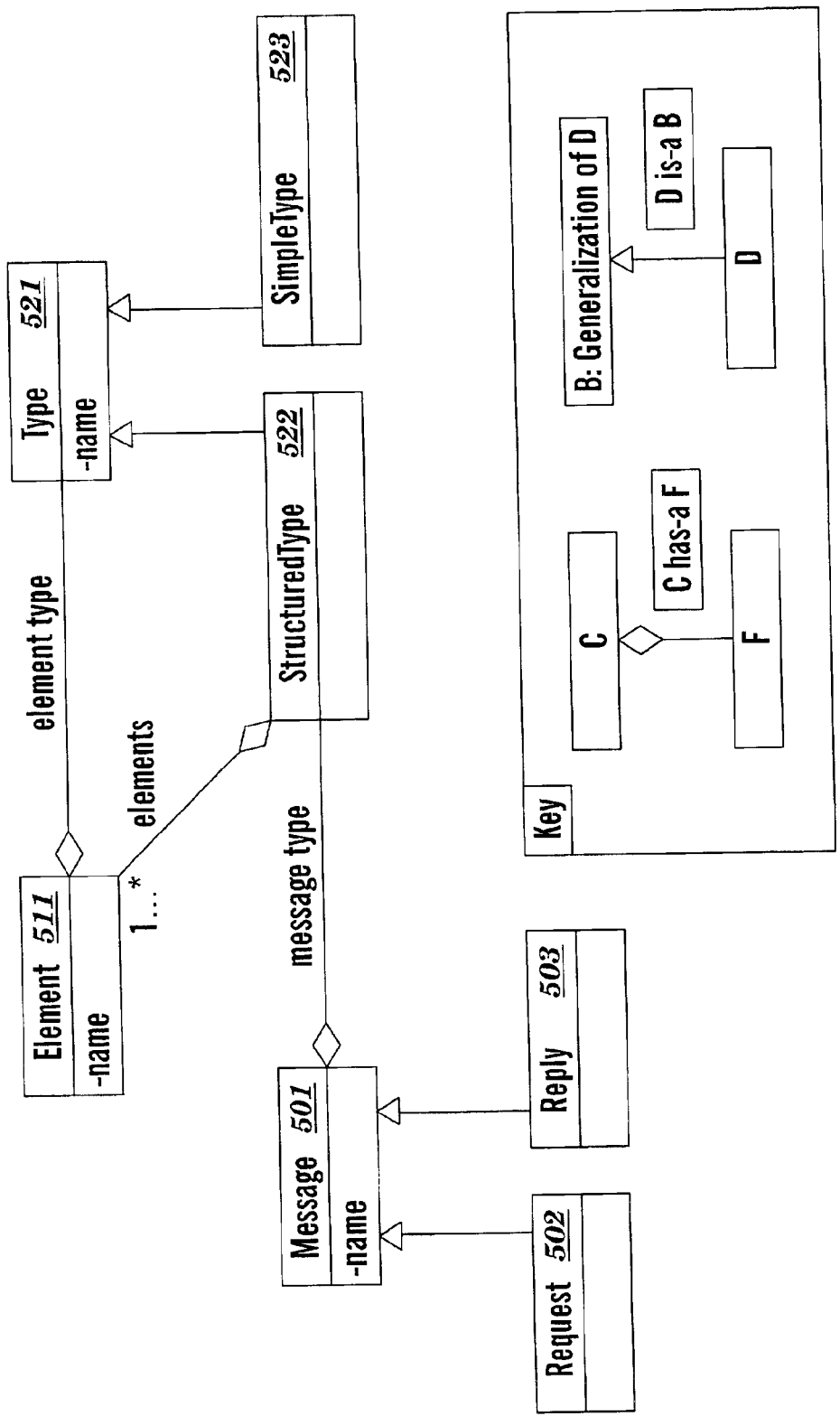
FIG. 5 depicts an exemplary representation of a message definition schema.

FIG. 5 depicts an exemplary representation of a message definition schema. The schema defines how to define a message (as opposed to the schema defining a message). Notice that FIG. 5 demonstrates inheritance hierarchies in the node types: some types are generalizations of others. FIG. 5 defines the following nodeType attributes:

Message
Request (is-a Message)
Reply (is-a Message)
Element
Type
StructuredType (is-a Type)
SimpleType (is-a Type)

Given these node types, the following are examples of simple node patterns:

| Simple Node Pattern | Attribute Pattern | Comment |
|---|---|---|
| MessagePattern | nodeType = Message | Includes both Request & Reply |
| NotMessagePattern | nodeType ! = Message | Excludes both Request & Reply |
| RequestPattern | nodeType = Request | |
| ReplyPattern | nodeType = Reply | |
| ElementPattern | nodeType = Element | |
| TypePattern | nodeType = Type | Included both StructuredType and SimpleType |
| StructuredTypePattern | nodeType = StructuredType | |
| SimpleTypePattern | nodeType = SimpleType | |

Figure 6:
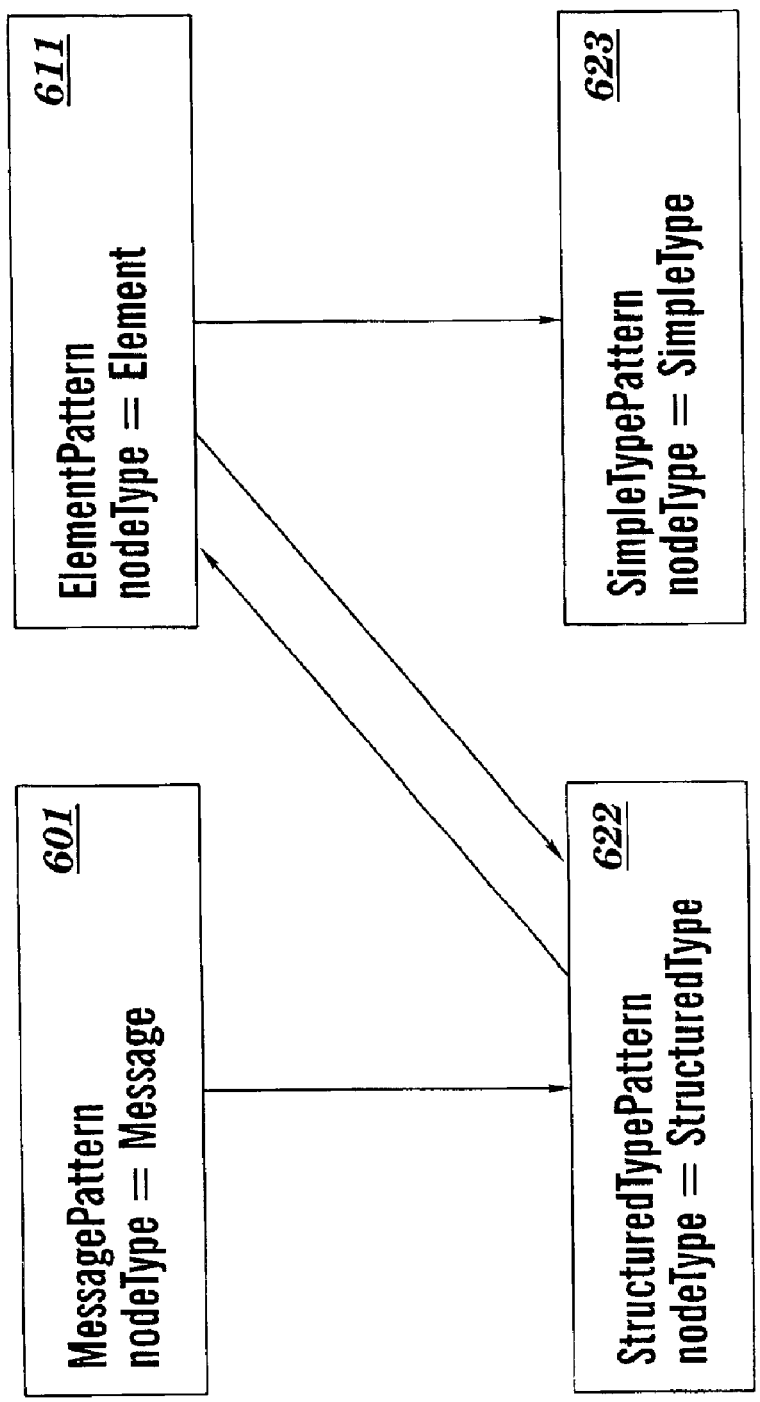
FIG. 6 depicts an exemplary node relationship graph (NRG) that describes the message definition schema of FIG. 5.

FIG. 6 depicts an exemplary node relationship graph (NRG) that describes the message definition schema of FIG. 5. Each node of the NRG is a simple node pattern describing the required attribute values for a matching node in a data graph.

Given the NRG, the following are examples of generational node patterns:

| Generational Node Pattern | Simple Node Pattern Sequence | Valid Sub-Node Patterns, computed and bound to each Simple Pattern in the context of the Generational Node Pattern |
|---|---|---|
| MessageType-Pattern | MessagePattern, StructuredTypePattern | {StructuredTypePattern} { } |
| TopLevel-ElementPattern | MessagePattern, | {StructuredTypePattern, ElementPattern}, |
| | StructuredTypePattern, ElementPattern | {ElementPattern} { } |
| TopLevel-TypePattern | MessagePattern, | {StructuredTypePattern, ElementPattern, TypePattern}, |
| | StructuredTypePattern, | {ElementPattern, TypePattern}, |
| | ElementPattern, TypePattern | {TypePattern}, { } |
| TopLevel-SimpleTypePattern | MessagePattern, | {StructuredTypePattern, ElementPattern, TypeSimplePattern }, |
| | StructuredTypePattern, | {ElementPattern, TypeSimplePattern }, |
| | ElementPattern, TypeSimplePattern | {TypeSimplePattern}, { } |
| TopLevelStructured-TypePattern | MessagePattern, | {StructuredTypePattern, ElementPattern, TypeStructuredPattern }, |
| | StructuredTypePattern, | {ElementPattern, TypeStructuredPattern }, |
| | ElementPattern, | {TypeStructured-Pattern }, |
| | TypeStructuredPattern | { } |
| LowLevel-ElementPattern | NotMessagePattern, | {StructuredTypePattern, ElementPattern } |
| | StructuredTypePattern, ElementPattern | {ElementPattern} { } |
| LowLevel-TypePattern | NotMessagePattern, | {StructuredTypePattern, ElementPattern, TypePattern}, |
| | StructuredTypePattern, | {ElementPattern, TypePattern}, |
| | ElementPattern, TypePattern | {TypePattern}, { } |

-continued

| Generational Node Pattern | Simple Node Pattern Sequence | Valid Sub-Node Patterns, computed and bound to each Simple Pattern in the context of the Generational Node Pattern |
|---|---|---|
| LowLevel-SimpleTypePattern | NotMessagePattern, | {StructuredTypePattern, ElementPattern, SimpleTypePattern }, |
| | StructuredTypePattern, | {ElementPattern, SimpleTypePattern }, |
| | ElementPattern, SimpleTypePattern | {SimpleTypePattern }, { } |
| LowLevel-StructuredTypePattern | NotMessagePattern, | {StructuredTypePattern, ElementPattern, StructuredTypePattern }, |
| | StructuredTypePattern, | {ElementPattern, StructuredTypePattern }, |
| | ElementPattern, | {StructuredType-Pattern }, |
| | StructuredTypePattern | { } |

Figure 7:
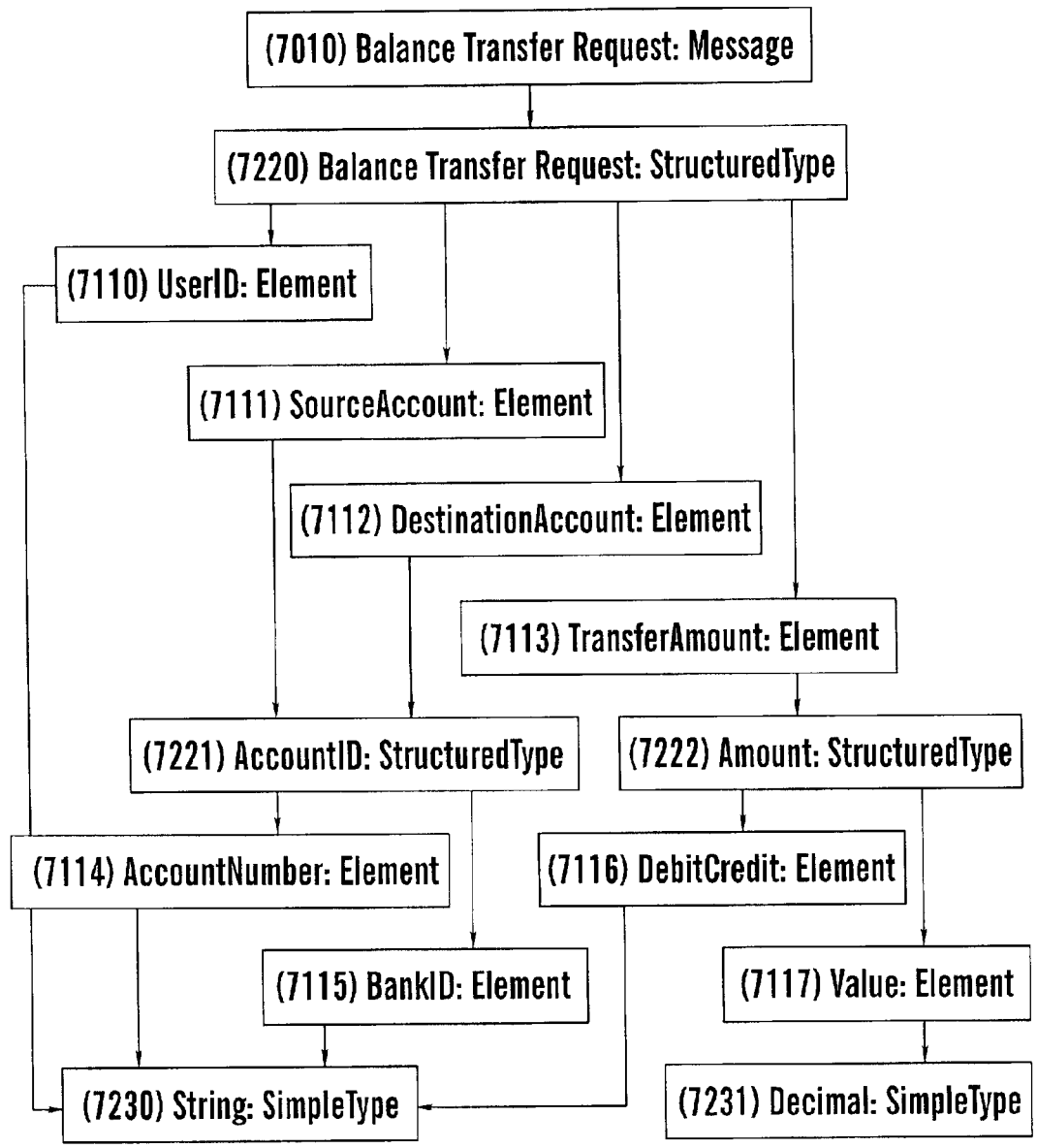
FIG. 7 depicts an exemplary data directed non-cyclic graph that describes a balance transfer request message, following the schema and NRG of FIGS. 5 and 6.

FIG. 7 depicts an exemplary data directed non-cyclic graph that describes a balance transfer request message, following the schema and NRG of FIGS. 5 and 6.

Figure 8:
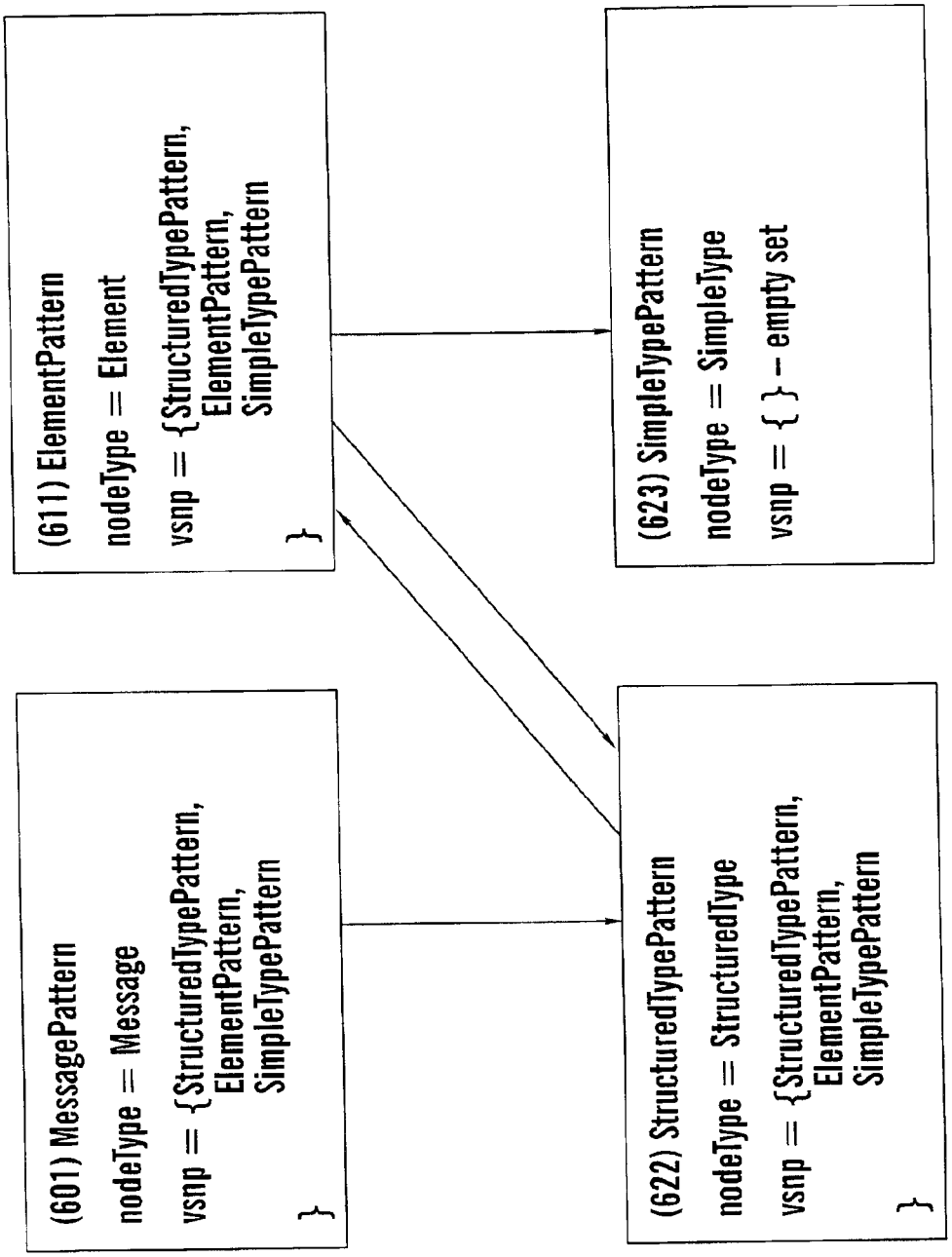
FIG. 8 depicts the NGO after calculating the set of valid sub-node pattern.

FIG. 8 depicts the NGO after calculating the set of valid sub-node pattern. Note that the NGO could be stored on disk with pre-computed vsnp sets.

It is understood that the components of the present invention can be realized in hardware, software, or a combination of hardware and software. Any kind of computer system—or other apparatus adapted for carrying out the methods described herein—is suited. A typical combination of hardware and software could be a general purpose computer system with a computer program that, when loaded and executed, carries out the methods described herein. Alternatively, a specific use computer, containing specialized hardware for carrying out one or more of the functional tasks of the invention could be utilized. Aspects of the present invention can also be embedded in a computer program product, which comprises all the features enabling the implementation of the methods described herein, and which—when loaded in a computer system—is able to carry out these methods. Computer program, software program, program, module, mechanism or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A graph walking system, comprising:

a binding system for binding a graph observer with a data graph, for binding node patterns to node observers to generate at least one node pattern/node observer pair, and for binding the data graph observer to at least one node pattern/node observer pairing, and wherein each node pattern includes a computed set of target sub-node patterns;

a node relationship graph (NRG), wherein each node in the NRG corresponds to at least one node in the data graph, and wherein each node in the NRG includes a computed set of valid sub-node patterns;

graph walking logic for systematically walking through nodes in the data graph and corresponding nodes in the NRG; and a pattern testing system that determines if the set of target sub-node patterns for a node pattern matches the set of valid sub-node patterns for a corresponding NRG node when a node is encountered in the data graph.

2. The graph walking system of claim 1, wherein the set of target sub-node patterns includes at least one generational node pattern.

3. The graph walking system of claim 1, further comprising a graph observer pruning system for deactivating a graph observer for sub-node processing when no matches occur between target sub-node patterns and valid sub-node patterns for an encountered node.

4. The graph walking system of claim 3, wherein the graph walking logic includes a sub-node pruning system for disabling the graph walking logic when all graph observers for a set of sub-node have been deactivated.

5. The graph walking system of claim 1, wherein the graph walking logic stores a list of node pattern/node observer pairs corresponding to matches made by the pattern testing system for each node.

6. The graph walking system of claim 5, wherein, for a root node, the pattern testing system tests each target sub-node pattern for all node patterns bound the graph observer, and adds a corresponding node pattern/node observer pair to the list of corresponding node pattern/node observer pairs for the root node.

7. The graph walking system of claim 5, wherein, for a child node, the pattern testing system tests each target sub-node pattern associated with the list of node pattern/node observer pairs stored for a parent node.

8. The graph walking system of claim 7, wherein the pattern testing system adds a corresponding node pattern/node observer pair to the list of corresponding node pattern/node observer pairs for the child node when a match occurs.

9. A system for optimizing a graph walking process of an inputted data graph based on inputted node patterns and a node relationship graph (NRG) that corresponds to the inputted data graph, the system comprising:

a system for generating a set of valid sub-node patterns for each node in the NRG;

a system for generating a set of target sub-node patterns for each inputted node pattern;

a graph processor for systematically walking through nodes within the data graph and corresponding nodes in the NRG; and a pattern testing system that determines if the target sub-node patterns for a node pattern match the valid sub-node patterns for a corresponding node in the NRG when a node is encountered in the data graph.

10. The system of claim 9, further comprising a first pruning system that can be instructed by a node observer bound with an associated graph observer to deactivate the associated graph observer for a set of sub-nodes when no matches occur between target sub-node patterns and valid sub-node patterns.

11. The system of claim 10, further comprising a second pruning system that can instruct the graph processor not to walk the set of sub-nodes if all graph observers have been deactivated.

12. The system of claim 9, wherein the graph processor includes a root node test, wherein the root node test tests all target sub-node patterns.

13. The system of claim 9, wherein the graph processor includes a child node test, wherein the child node test tests only target sub-node patterns associated with node patterns that had at least one match in a parent node.

14. A method for analyzing a graph of hierarchical data, comprising the steps of:
- binding a plurality of graph observers to the graph, wherein each graph observer is further bound to a set of inputted node patterns and a set of inputted node observers;
- computing a set of target sub-node patterns for each inputted node pattern;
- providing a node relationship graph (NRG) for the graph, wherein each node in the NRG corresponds to a node in the graph;
- computing a set of valid sub-node patterns for each node in the NRG;
- systematically walking through nodes within the graph;
- testing to determine if the target sub-node patterns for a node pattern matches the valid sub-node patterns for a corresponding NRG node when a node is encountered in the graph; and
- deactivating an identified graph observer for sub-nodes of an encountered node if none of the target sub-node patterns associated with node patterns bound to the identified graph observer match valid sub-node patterns.

15. The method of claim 14, comprising the further step of reactivating the identified graph observer after the sub-nodes of the encountered node have been walked.

16. A program product stored on a recordable medium, which when executed, optimizes a graph walking process of an inputted data graph based on inputted node patterns and a node relationship graph (NRG) that corresponds to the inputted data graph, the program product comprising:
- means for generating a set of valid sub-node patterns for each node in the NRG;
- means for generating a set of target sub-node patterns for each inputted node pattern;
- means for systematically walking through nodes within the data graph and corresponding nodes in the NRG; and
- means for determining if the target sub-node patterns for a node pattern match the valid sub-node patterns for a corresponding node in the NRG when a node is encountered in the data graph.

17. The program product of claim 16, further comprising a first pruning system that can be instructed by a node observer bound with an associated graph observer to deactivate the associated graph observer for a set of sub-nodes when no matches occur between target sub-node patterns and valid sub-node patterns.

18. The program product of claim 17, further comprising a second pruning system that can instruct the graph processor not to walk the set of sub-nodes if all graph observers have been deactivated.

19. The program product of claim 16, wherein the determining means includes a root node test, wherein the root node test tests all target sub-node patterns.

20. The program product of claim 16, wherein the determining means includes a child node test, wherein the child node test tests only target sub-node patterns associated with node patterns that had at least one match in a parent node.

* * * * *

UNITED STATES PATENT AND TRADEMARK OFFICE
CERTIFICATE OF CORRECTION

PATENT NO. : 6,922,692 B2
DATED : July 26, 2005
INVENTOR(S) : Clewis et al.

It is certified that error appears in the above-identified patent and that said Letters Patent is hereby corrected as shown below:

Column 7,
Line 4, please take out the first number "1" and insert -- n --.

Signed and Sealed this

Twenty-fifth Day of October, 2005

JON W. DUDAS
*Director of the United States Patent and Trademark Office*